US008875949B2

(12) United States Patent
Sevcik et al.

(10) Patent No.: US 8,875,949 B2
(45) Date of Patent: Nov. 4, 2014

(54) BEVERAGE DISPENSER USING SLURRY ICE HEAT TRANSFER

(75) Inventors: Scott Sevcik, Crystal Lake, IL (US); Andrew Tobler, Geneva, IL (US)

(73) Assignee: Cornelius, Inc., St. Paul, MN (US)

( * ) Notice: Subject to any disclaimer, the term of this patent is extended or adjusted under 35 U.S.C. 154(b) by 156 days.

(21) Appl. No.: 13/400,233

(22) Filed: Feb. 20, 2012

(65) Prior Publication Data

US 2013/0214003 A1 Aug. 22, 2013

(51) Int. Cl.

| | |
|---|---|
| ***B67D 7/80*** | (2010.01) |
| ***B67D 7/06*** | (2010.01) |
| ***B67D 7/56*** | (2010.01) |
| ***G01F 11/00*** | (2006.01) |
| ***G01F 13/00*** | (2006.01) |

(52) U.S. Cl.
USPC ............ 222/146.6; 222/23; 222/217; 62/393; 62/449

(58) Field of Classification Search
USPC ................ 222/1, 146.1, 23, 241, 146.6, 217; 62/177, 393, 398, 400, 392, 449
See application file for complete search history.

(56) References Cited

PUBLICATIONS

PCT Search Report, Apr. 4, 2013, IMI Cornelius, Inc.

*Primary Examiner* — Paul R Durand
*Assistant Examiner* — Vishal Pancholi
(74) *Attorney, Agent, or Firm* — Andrus Intellectual Property Law, LLP

(57) ABSTRACT

A beverage dispenser that uses a slurry ice heat transfer approach to achieve a lower cost solution for controlling the temperature of a beverage to be dispensed. A cost effective heat transfer approach can be achieved by replacing the cold plate or refrigeration system of prior art beverage dispensers with a slurry ice bath. The invention provides a hopper into which a slurry ice bath is created. The hopper has an access door for receiving ice and an interior valve for dispensing either carbonated water or still water to form a slurry ice bath. Coils containing a beverage to be dispensed are submersed in the slurry ice bath. The slurry ice causes heat to transfer from the coils, thereby maintaining the coils at a certain temperature.

10 Claims, 2 Drawing Sheets

BEVERAGE DISPENSER USING SLURRY ICE HEAT TRANSFER

BACKGROUND OF THE INVENTION

1. Field of the Invention

The present invention relates generally to the field of beverage dispensers and more particularly to a lower cost approach to achieving the heat transfer requirements of beverage products.

2. Description of the Prior Art

Refrigerated beverage dispensers are used to control the temperature at which beverages are dispensed. Prior art devices use heat transfer schemes that consist of a cold plate or a mechanical refrigeration ice bank.

For dispensers using a cold plate system, it is common to have the store personnel load ice into the machine. The ice is used as the heat transfer medium to absorb heat from the cold plate and subsiding tubes containing the beverage. These systems typically require electricity for moving ice to achieve proper cold plate coverage.

In dispensers using a mechanical refrigeration system, an "ice bank" is created via a refrigeration system. The ice bank of a particular size and mass is used for cooling tubes containing product to be dispensed. These tubes reside in a water bath that contains the refrigeration-created ice bank. Dispensers using this refrigeration technique typically require electricity for operating the mechanical refrigeration system.

It would be extremely advantageous to have a refrigerated beverage dispenser that dispenses refrigerated beverages at a reduced cost by eliminating all electronic components and the need for electricity.

SUMMARY OF THE INVENTION

The present invention relates to a beverage dispenser that uses slurry ice to achieve heat transfer. This results in a lower cost solution for controlling the temperature of a beverage to be dispensed. A more cost effective heat transfer approach can be achieved by replacing the cold plate or refrigeration system of prior art beverage dispensers with a slurry ice bath. The invention generally provides a hopper into which a slurry ice bath is created. The hopper has an access door for receiving ice and an interior valve for dispensing either carbonated water or still water to form a slurry ice bath. Coils containing a beverage to be dispensed are submersed in the slurry ice bath. The slurry ice causes heat to transfer from the coils, thereby maintaining the coils at a certain temperature. The system can have an optional agitator, and temperature monitoring.

DESCRIPTION OF THE FIGURES

Attention is now directed to drawings that illustrate the features of the present invention.

Several drawings and illustrations have been presented to aid in understanding the present invention. The scope of the present invention is not limited to what is shown in the figures.

DETAILED DESCRIPTION OF THE PREFERRED EMBODIMENT

Figure 1:
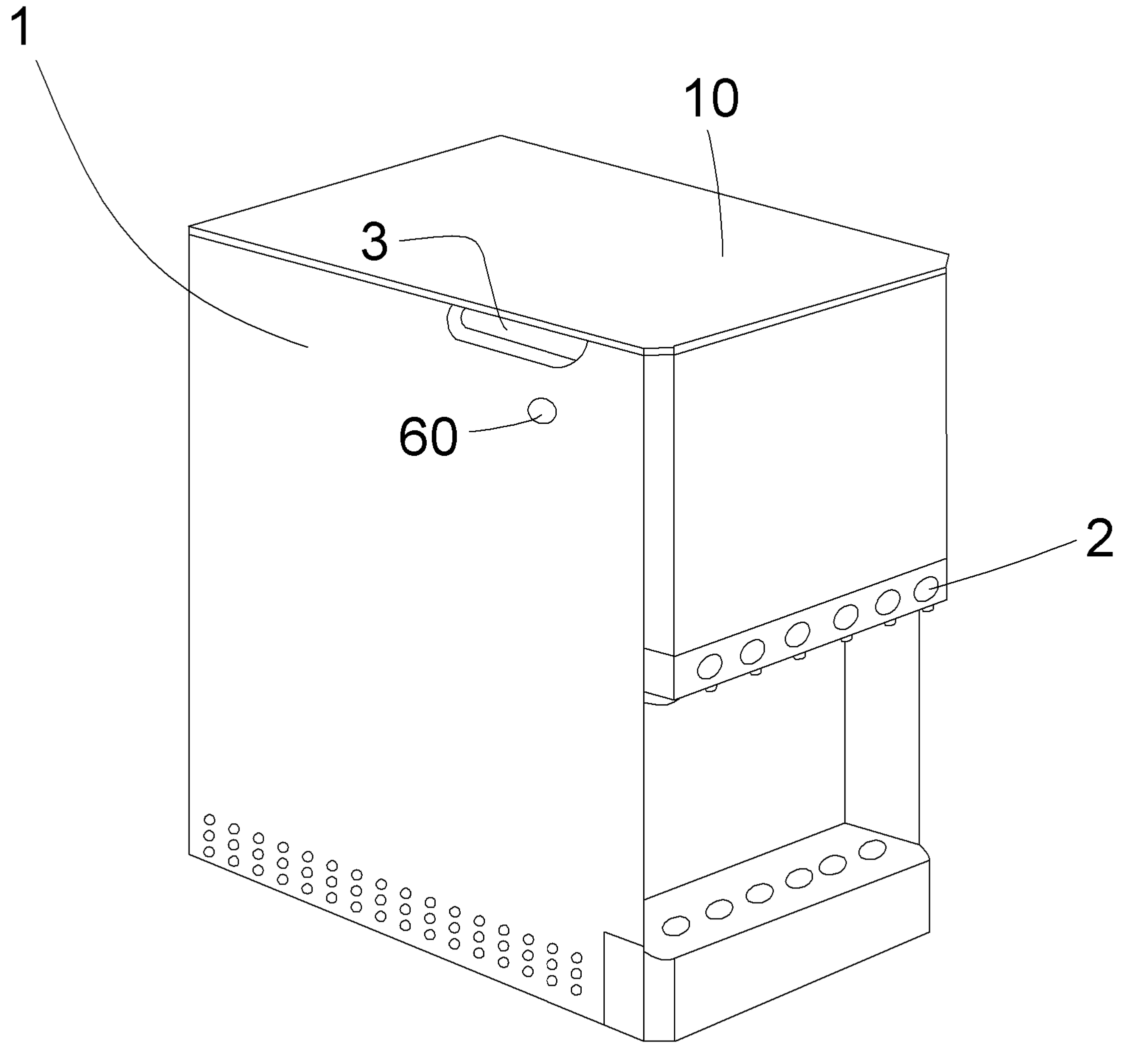
FIG. 1 shows a perspective view of a beverage dispenser according to the present invention.
Figure 2:
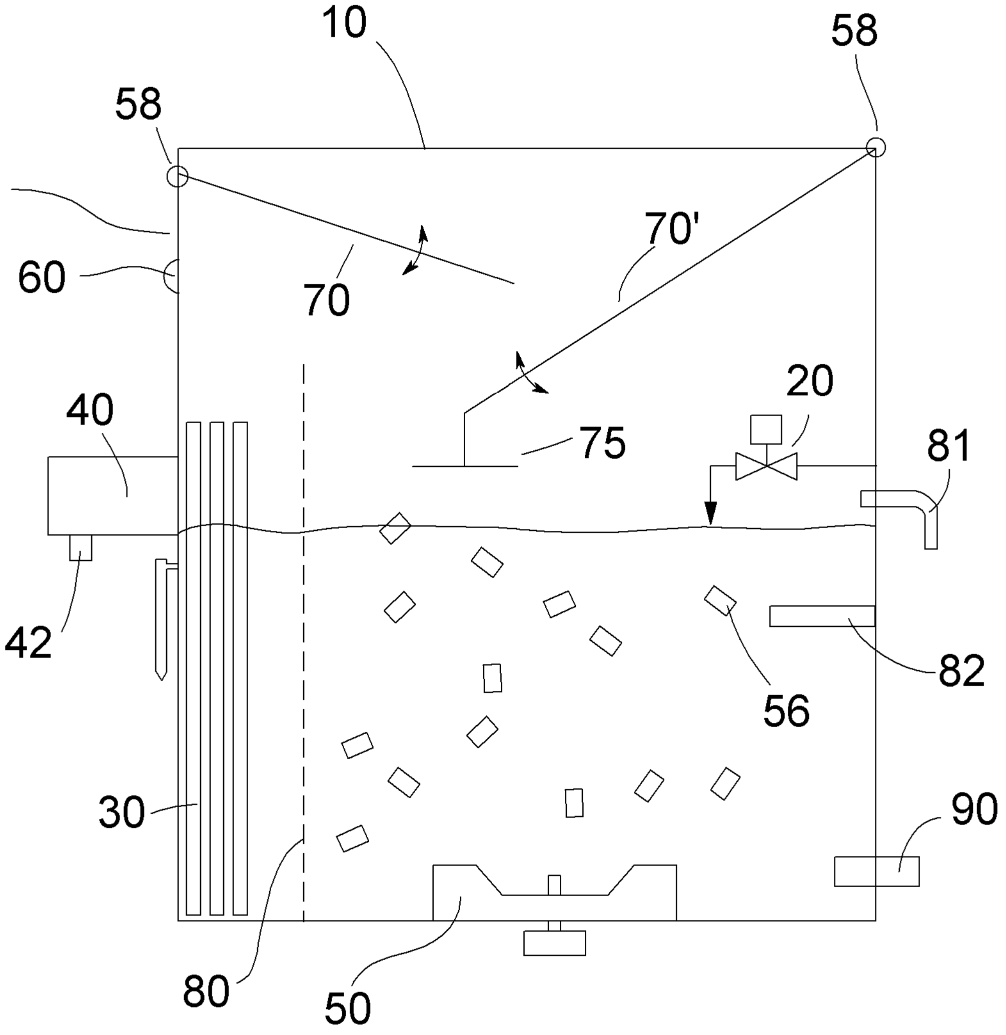
FIG. 2 shows a schematic diagram of the interior of an embodiment of the present invention.

Referring now to the drawings, in which like numerals refer to like elements throughout the several views, FIGS. 1-2 show an embodiment of A refrigerated beverage dispenser according to the present invention that uses slurry ice. Slurry ice is a refrigerant made up of a large number of micro ice crystals (typically 0.1 to 1 mm in size) formed and suspended within a solution of water or other liquid.

FIG. 1 shows a perspective view of a beverage dispenser according to the present invention. The dispenser includes an outer cabinet or hopper 1 with an access handle 3 and a removable access lid 10. Beverages are dispensed by pressing buttons 2 on the front. Each button 2 corresponds to beverage syrup type of carbonated or noncarbonated beverages. The buttons 2 may also correspond to a particular flavoring. The invention is not limited to the number of buttons 2 or beverage type. An optional alert light 60 located on the cabinet 1 can be attached to an internal temperature sensing device 82. The alert light 60 can activate to show that internal temperature is too high or to show any other abnormal condition. The alert light 60 may optionally be battery powered.

The beverage dispenser includes a removable access door 10 through which ice may be added into the beverage dispenser, where an ice bath is formed in a hopper. The ice may come from a transportation device such as a bucket or from an ice machine.

FIG. 2 shows a schematic of the preferred embodiment of the present invention. The cabinet 1 can include a valve 20 to dispense either carbonated or still water into the beverage dispenser once the ice 56 is added. The valve 20 may also dispense a reusable liquid, such as glycol. The ice and carbonated or still water (or glycol) creates ice slurry which provides a cold liquid-solid medium for removing the heat from immersed coils 30. These coils 30 contain the product to be cooled and dispensed. The ratio of ice to liquid can be prescribed to match the anticipated use, targeted efficiency, and capacity for the upcoming day of events (e.g. high volume or low volume accounts). An advantage of filling the beverage dispenser with carbonated water is the carbonated water offers good disinfectant potential to prevent or reduce bacteria and/or bio-slime.

As stated, the immersed coils 30 carry a beverage product to be dispensed, such as a syrup and/or water, through a connected valve 40 and dispenser port 42. The syrup and/or carbonated water is chilled as it runs through the immersed coils 30. The syrup and carbonated water are typically mixed in or near the nozzle 12. The coils 30 are immersed in the ice slurry to remove heat from the coils 30, thereby maintaining the beverage product at a desired temperature. The connected valve 40 may be a mechanical or electrical valve extending to the exterior of the beverage dispenser cabinet 1.

The type of ice added impacts the ice slurry performance. For example, ice having smaller crystals leads to a colder ice slurry than ice with larger crystals. Common systems include ½ cube ice makers and storage systems. Optional ice crushing devices can be adapted to crush the ½ cube ice and thereby create smaller ice crystals for mixing with the carbonated or still water. Slurry ice has greater heat absorption properties then single phase refrigerants (such as brine) because the melting enthalpy (i.e. latent heat) of the ice contributes to the cooling effect.

The beverage dispenser may also include an agitation device 50 for providing circulation to the ice slurry so that the submersed coils maintain a cold boundary of slurry or liquid. The agitation device 50 may be manually or electrically activated. The beverage dispenser may include a temperature sensing device with a alert light 60 capable of indicating that the temperature of the slurry has exceeded a preset value. In response, store personnel may activate the agitation device 50 or add additional ice to the beverage dispenser. As additional ice is added, the level of the ice slurry in the beverage dispenser raises. An optional overflow valve 81 can be provided to drain out excess liquid.

The interior of the beverage dispenser includes a sloping geometry including at least one adjustable slope 70, 70' attached to the interior of the beverage dispenser. The sloping geometry is typically located under the access door 10. When ice is added to the access door 10, the ice gradually cascades down toward the water bath, thereby preventing the ice from splashing into the bath bin. The slope 70, 70' is connected to the beverage dispenser by one or more hinges 58 which allow the angle of the slope 70 to be adjustable, thereby allowing for variation in the speed with which the ice descends into the bath bin.

In a particular embodiment, the beverage dispenser includes two opposing slopes 70, 70' as seen in FIG. 2. The first slope 70 overhangs the second slope 70'. Therefore, ice that is added to the access door cascades down the first slope 70 and onto the underlying second slope 70'. The ice then splashes into the beverage dispenser underneath the first slope 70, which acts as a splash shield.

In another embodiment, a slope 70' is operatively coupled to the access door 10, such that the slope 70' rotates in conjunction with the access door 10. In this configuration, the slope 70' is lifted as the access door 10 is rotated to its open position, and the slope 70' is pushed down as the access door 10 is rotated to the closed position.

A screen 75 may be provided to press ice towards the bottom of the hopper and thus force the displacement of the still water, carbonated water, or other liquid to the top of the bath bin and out the overflow valve. The screen 75 may be attached to slope 70', or to any other component within the beverage dispenser. The screen 75 may be made of a material that is permeable by liquid, thus allowing the liquid to displace to the top of the bath bin while forcing the ice to the bottom. A second screen 80 may optionally be provided to contain the ice to certain areas of the beverage dispenser while allowing only cold liquid to reach other areas. For example, a second screen 80 may be provided to prevent the ice from touching the immersed coils 30, while still allowing the cold liquid to contact the coils 30.

Optional recirculation valves 90 may be provided for the inflow and outflow of external recirculation. The recirculation valves 90 can be plumbed to an external chiller or recirculation device. Recirculation of the still water, carbonated water or glycol through the ice bath can act as an additional cooling medium. Additionally, the beverage dispenser may act as a cold source generator for an external device by circulating the liquid in the ice bath to the external device.

Several descriptions and illustrations have been provided to aid in understanding the present invention. One skilled in the art will realize that numerous changes and variations can be made without departing from the spirit of the invention. Each of these changes and variations is within the scope of the present invention.

What is claimed is:

1. A beverage dispenser comprising:

a hopper having an access door, said hopper adapted to contain a slurry ice mixture;

a first and second slope each coupled to the hopper by a hinge, the second slope extending beneath the first slope and being rigidly affixed to the access door;

a valve opening inside the hopper to dispense a liquid into the hopper;

an overflow drain attached to said hopper;

beverage coils situated in said hopper, the beverage coils being submersed in the slurry ice mixture.

2. The beverage dispenser of claim 1 further comprising a temperature sensor.

3. The beverage dispenser of claim 1 further comprising an alert light.

4. The beverage dispenser of claim 3 wherein said alert light is attached to a temperature sensor.

5. The beverage dispenser of claim 1 wherein said liquid is water.

6. The beverage dispenser of claim 1 wherein said liquid is carbonated water.

7. The beverage dispenser of claim 1 wherein said liquid contains glycol.

8. The beverage dispenser of claim 1 further comprising an agitator.

9. The beverage dispenser of claim 8 wherein said agitator is electric.

10. The beverage dispenser of claim 1 further comprising a screen attached to said second slop adapted to push ice downward in the hopper when the access door is closed.

* * * * *